UNITED STATES PATENT OFFICE.

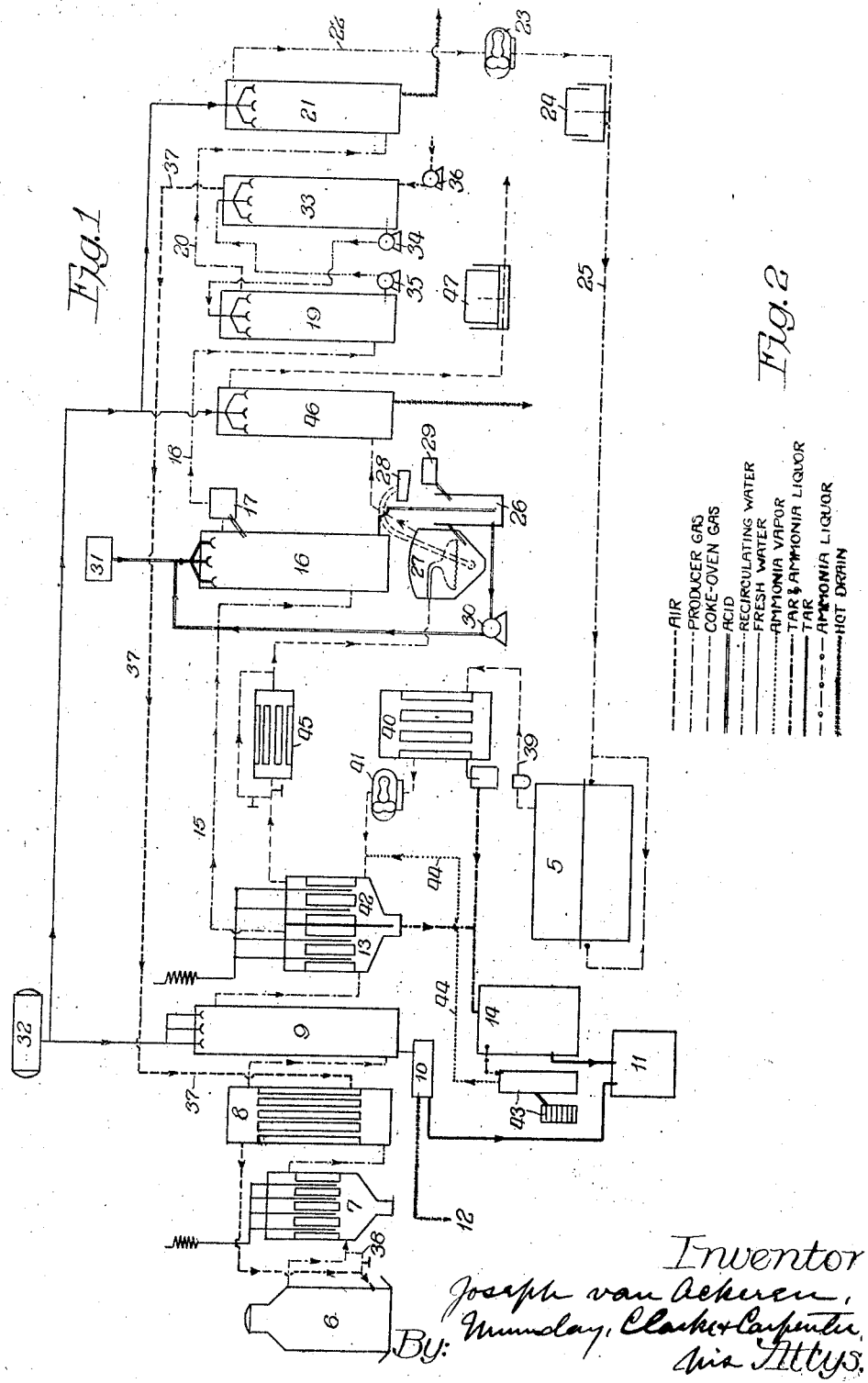

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,307,571.  Specification of Letters Patent.  Patented June 24, 1919.

Application filed August 12, 1918. Serial No. 249,381.

*To all whom it may concern:*

Be it known that I, JOSEPH VAN ACKEREN, (assignor to H. Koppers Company, a corporation of Pennsylvania,) a subject of Germany, who has declared his intention of becoming a citizen of the United States, and is residing in Pittsburgh, in the county of Allegheny and State of Pennsylvania, have invented a new and useful Improvement in Ammonia and Tar Recovery Processes, of which the following is a specification.

My invention relates primarily to the recovery of tar and of ammonia from producer-gas and from coke-oven gas and has for an object the efficient production of a clean, dust-free and high-grade tar, and for a further object the recovery of ammonia from producer-gas and coke-oven gas simultaneously in a combined production of high-grade ammonium sulfate derived from the ammonia of both the producer-gas and the coke-oven gas in a unitary operation; and the invention may also be applicable to the treatment of a gas or gases otherwise derived from the carbonization of coal, and may also have such other objects and results as are found to obtain in the processes hereinafter set forth and claimed.

In the accompanying drawings, Figure 1 is a conventional diagram illustrating an embodiment of the invention in a preferred arrangement of apparatus for practising its processes; and Fig. 2 is a key to the symbols employed in the various lines that show the connections between the apparatus indicated in Fig. 1.

5 indicates a coke-oven battery from which coke-oven gas is derived and that is fired with producer-gas derived from the gas-producer 6. The evolved producer-gas from said gas-producer 6 passes first to the electrical precipitator 7. Such producer-gas entering the electrical precipitator is still at very high temperature, about 450° C., and its water saturation point is only about 80° C., and therefore it is still greatly superheated in respect of its water and tar and these, and its other vaporizable content, are carried as vapor into and through such precipitator 7 and said precipitator acts only to free the passing gas from dust and other solid impurities in its current. From said precipitator 7 the producer-gas, without having undergone appreciable cooling, passes to the superheater 8, through which it flows in counter-current with the saturated air that is on the way to the producer. This saturated air has a temperature of about 70° C. when it enters the said superheater 8; and as a result of the heat interchange in passing through this superheater, the producer-gas issues with its temperature reduced to about 280° C., and the air issues with its temperature raised to about 220° C. and at such temperature passes to the grate of the producer 6. The partially cooled producer-gas from the said superheater 8 passes, still carrying its water and tar as vapor, to the water-sprayed cooler 9, which has the primary function of further cooling the gas to a large extent, and the incidental function of further cleaning such gas by precipitating any residue of dust or other solid impurities. A slight amount of tar may also be taken out in said cooler 9 and require to be drained from its discharge trough 10 into the tar tank 11, the wastewater from said trough 10 discharging through the outlet line 12. But nearly all of the tar is carried through said cooler as vapor in the gas because the gas enters the cooler at a temperature of about 280° C. and is still superheated when leaving it, though cooled down toward about 90° C. Such still superheated producer-gas passes from said cooler 9 to the compartment 13 of an electrical precipitator, which it enters at a temperature of about 90° C., and at such temperature the tar, approaching the character of a finely comminuted mist, will be precipitated; and the clean tar so precipitated is discharged into the tar and liquor tank 14, from which it flows into the aforesaid tar-tank 11. The producer-gas passes from said tar-precipitator compartment 13 through the gas-line 15 to the hot acid-washer tower 16, which it enters at a temperature of about 85° C., still a little above its saturation point. In said acid tower the ammonia is absorbed from the producer-gas and the ammonia-freed producer-gas leaves the acid washer at a temperature of about 82° C., still slightly above its saturation point of 80° C., the acid-solution being kept hot by the absorption reaction, so that there can not be any diluting of the ammonia absorbing acid-solution that is flowing through said acid washer; and by reason of the little superheat remaining in the gas practically no water is picked up by the gas in passing through said acid washer, and so there is no precipitation of ammonium sulfate in said acid washer. Thence the ammonia-freed gas flows through the acid separator 17, in which it is freed of such acid as it may carry with it, and then flows through the gas-line 18 to the first-stage final-cooler 19, through which it flows in counter-current with warm water that enters such cooler at about 50° C. In this cooler the gas is cooled to about 65° C. and to a great extent dehydrated and thence passes, through the gas-line 20, to the second-stage final-cooler 21, through which it passes in counter-current with cold water and issues finally dehydrated and cooled to a temperature of about 25° C. Such clean, cool and relatively dry producer-gas is drawn off, through the gas-line 22, by the exhauster 23, and thence is forwarded to the producer-gas holder 24 and on, through the producer-gas line 25, to the before-mentioned coke-ovens 5, in which such producer-gas is burned to provide the heat for the coking of the coal-charges of the ovens.

The ammonia-charged acid-solution from the aforesaid acid washer 16 is conveyed to the mother-liquor tank 26, which feeds the saturator 27. Said mother-liquor tank 26 also receives the drain from the saturator's drain-table 28 and centrifugal drier 29; and the surplus acid-solution from said mother-liquor tank is forced back, by the acid-pump 30, to the acid-washer 16, maintaining a constant circulation of the hot acid-solution, to which a proportion of fresh acid is constantly added from the acid-tank 31.

The before-mentioned primary cooler 9 and second-stage final-cooler 21, for the producer-gas, are cooled by fresh water continuously supplied from the water-tank 32, and from both of these coolers the waste-water flows to the sewer. But the first-stage final-cooler 19, for the producer-gas, receives its warm water, at a temperature, as before mentioned, of about 50° C., from the air-saturator tower 33, from which such water is drawn by the warm-water pump 34; and the water issuing from said first-stage final-cooler 19 has a temperature of about 80° C. and is forced, by the hot-water pump 35, to the top of the said air-saturator tower, into which it is sprayed,—there being, as just mentioned, a constant recirculation of water through said first-stage final-cooler and said air-saturator. The air to be saturated and heated is forced into said air-saturator tower by the air fan 36, and enters the tower at a temperature of about 25° C. The air leaves the tower saturated at a temperature of about 70° C. and passes through the air-line 37 to the before-mentioned superheater 8, through which it flows in counter-current with the hot producer-gas. Issuing from said superheater the air has a temperature of about 220° C. and passes to the grate of the producer, as before mentioned. A portion of the hot producer-gas issuing from the producer may be introduced into this air-line through the by-pass 38, as a further control of the heat and gasification conditions in the gas-producer 6.

The coke-oven gas from the coke-ovens 5 passes through the gas-line 39, at a temperature of about 80° C., to the primary cooler 40 and thence is forwarded, by the exhauster 41, to the compartment 42 of the electrical precipitator whose other before-mentioned compartment, 13, serves for the precipitation of tar from the producer-gas. In the primary cooler 40 the coke-oven gas is cooled to about 25° C. and the consequent condensate of tar and ammonia-liquor is drained from such cooler and conveyed to the tar and liquor tank 14, in which the tar and ammonia-liquor are separated, the tar flowing off into the tar tank 11 and the ammonia-liquor flowing to the ammonia-still 43. The vapors from this still flow, at a temperature of about 100° C., through the ammonia-vapor line 44 leading into the coke-oven gas-line between the exhauster 41 and the electrical precipitator compartment 42, and the mixture of such vapors and coke-oven gas enters the said precipitator at a temperature of about 35° C. At this temperature both the tar residue in the coke-oven gas and the water of the still-vapors will be precipitated, in said precipitator compartment 42, and the so precipitated tar and condensate flow off from the precipitator into the before-mentioned tar and liquor tank 14. The tar-freed coke-oven gas, with its own content of ammonia and its admixture of ammonia-vapor from the still, flows from the electrical precipitator compartment 42 to the before-mentioned saturator 27, entering the same at a temperature of about 35° C. Or such temperature may be raised a little by passing the gas through the small reheater 45, around which the gas is preferably by-passed on its way from the said precipitator 42 to the said saturator 27. Discharging through the saturation-bath of the said saturator 27, the coke-oven gas both gives up its ammonia and effects the evaporation requisite to precipitate the ammonium sulfate derived not only from said ammonia of the coke-oven gas but also from the ammonia of the acid-solution from the acid-washer 16 for the producer-gas, thus accomplishing a combined and simultaneous recovery of the ammonia from both the coke-oven gas and the producer-gas, in a uniform and high grade of ammonium sulfate, all produced from one saturation-bath. The coke-oven gas issuing from the sa urator 27, at a temperature of about 45° C., passes to the final-cooler 46, which is sprayed with cold water from the before-mentioned water tank 32. And such finally cooled coke-oven gas, at a temperature of about 25° C., passes from said final-cooler to the coke-oven gas-holder 47 and thence to whatever service it may be employed in.

The processes of the invention may be practised in various ways, other than the particular embodiment that has been described for purposes of illustration, and still be within the scope and subject matter of the claims hereinafter made.

The disclosure herein relating to the two-stage precipitation of dust and tar is made the subject of a divisional application filed May 26, 1919, Ser. No. 299,854.

I claim:

1. In a process for the recovery of ammonia from producer-gas and coke-oven gas simultaneously, the combination of steps that consists in: absorbing the ammonia from the dust-freed and tar-freed producer-gas, at nearly its saturation temperature, by an acid-wash; conveying the mother-liquor from such acid-wash to a saturation-bath; and passing the tar-freed coke-oven gas, of relatively low temperature, through said saturation-bath, therein effecting the absorption of ammonia from said coke-oven gas and simultaneously effecting the deposition of ammonium sulfate derived from both such ammonia given up by the coke-oven gas and from the aforesaid mother-liquor charged with the ammonia of the producer-gas; the heat in the saturator-bath being mainly derived from the heating of the acid-solution in the acid-wash for the high-temperature gas, and the relatively low-temperature gas acting as the carrier for the evaporation from the saturation-bath through which said gas passes; substantially as specified.

2. In a process for the recovery of tar and ammonia from producer-gas, the combination of steps that consists in: electrically precipitating the dust from the hot gas from the producer; then subjecting said dust-freed gas to a primary cooling by passing it in counter-current with the air going to the producer; then further cooling and washing said gas with water; then electrically precipitating the residue of the tar from such partially cooled but still hot gas; and then passing such still hot gas through an acid-wash to absorb the ammonia; substantially as specified 3. In a process for the recovery of tar and ammonia from producer-gas and coke-oven gas simultaneously, the combination of steps that consists in: electrically precipitating the dust from the hot producer-gas from the producer; subjecting said dust-freed gas to a primary cooling by passing it in counter-current with the air going to the producer; then further cooling and washing said producer-gas in counter-current with water; then electrically precipitating the residue of the tar from said partially cooled but still hot gas; then passing such gas through an acid-wash to absorb the ammonia; passing the coke-oven gas from the ovens through a primary cooling operation and then electrically precipitating the residue of the tar therefrom; and passing such tar-freed coke-oven gas, of relatively low temperature, to and through a saturation-bath to which the mother-liquor from the acid-wash of the producer-gas is also conveyed, and effecting the deposition of the ammonium sulfate in said saturation-bath; the heat in the saturator-bath being mainly derived from the heating of the acid-solution in the acid-wash for the high-temperature gas, and the relatively low-temperature gas acting as the carrier for the evaporation from the saturation-bath through which said gas passes: substantially as specified.

4. In a process for the recovery of ammonia from producer-gas and coke-oven gas simultaneously, the combination of steps that consists in: absorbing the ammonia from the tar-freed producer-gas by passing said gas through an acid-solution at a temperature near enough to the saturation-point of said gas so as substantially to preclude both diluting of said solution and the deposition of ammonium sulfate therein; conducting said ammonia-charged acid-solution to a saturation-bath; and passing the tar-freed coke-oven gas, of relatively low temperature, through said saturation-bath at a temperature such that said coke-oven gas, giving up its own ammonia in said bath, effects the continuous deposition of ammonium sulfate in said bath; the heat in the saturator-bath being mainly derived from the heating of the acid-solution in the acid-wash for the high-temperature gas, and the relatively low-temperature gas acting as the carrier for the evaporation from the saturation-bath through which said gas passes; substantially as specified.

5. In a process for the recovery of ammonia from coke-oven gas, the combination of steps that consists in: cooling the gas and draining off the condensate ammonia-liquor; distilling said ammonia-liquor; passing the said gas and the still-vapors together through an electrical precipitator, to precipitate the tar residue from the gas and the water from the still-vapors; and then passing the commingled gas and still-vapors through an ammonia-absorbing acid-solution and effecting the deposition of ammonium-sulfate; substantially as specified.

6. In a process for the recovery of ammonia from two different ammonia-charged gases simultaneously, the combination of steps that consists in: absorbing the ammonia from the dust-freed and tar-freed gas of one type, at nearly its saturation temperature, by an acid-wash; conveying the mother-liquor from such acid-wash to a saturation-bath; and passing the tar-freed other gas, of relatively low temperature, through said saturation-bath, therein effecting the absorption of ammonia from said other gas and simultaneously effecting the deposition of ammonium sulfate derived from both such ammonia given up by said other gas and from the aforesaid mother-liquor charged with the the ammonia of the first-named gas; the heat in the saturator-bath being mainly derived from the heating of the acid-solution in the acid-wash for the high-temperature gas, and the relatively low-temperature gas acting as the carrier for the evaporation from the saturation-bath through which said gas passes; substantially as specified.

7. In a process for the recovery of ammonia from two different ammonia-charged gases simultaneously, the combination of steps that consists in: absorbing the ammonia from the tar-freed gas of one type by passing said gas through an acid-solution at a temperature near enough to the saturation-point of said gas so as substantially to preclude both diluting of said solution and the deposition of ammonium sulfate therein; conducting said ammonia-charged acid-solution to a saturation-bath; and passing the tar-freed other gas, of relatively low temperature, through said saturation-bath at a temperature such that said other gas, giving up its own ammonia in said bath, effects the continuous deposition of ammonium sulfate in said bath; the heat in the saturator-bath being mainly derived from the heating of the acid-solution in the acid-wash for the high-temperature gas, and the relatively low-temperature gas acting as the carrier for the evaporation from the saturation-bath through which said gas passes; substantially as specified.

8. In a process for the recovery of ammonia from ammonia-charged gas, the combination of steps that consists in: cooling the gas and draining off the condensate ammonia-liquor; distilling said ammonia-liquor; passing the said gas and the still-vapors together through an electrical precipitator, to precipitate the tar residue from the gas and the water from the still-vapors; and then passing the commingled gas and still-vapors through an ammonia-absorbing acid-solution and effecting the deposition of ammonium-sulfate; substantially as specified.

In testimony whereof I hereunto set my hand in the presence of two subscribing witnesses.

JOS. van ACKEREN.

Witnesses:
JOSEPH DVORAK,
W. V. BLACKSTONE.